United States Patent [19]
Planche et al.

[11] Patent Number: 5,880,185
[45] Date of Patent: Mar. 9, 1999

[54] METHOD FOR PREPARING REINFORCED MULTIGRADE BITUMEN/POLYMER AND USE OF THE RESULTING COMPOSITIONS FOR PRODUCING BITUMEN/POLYMER BINDERS FOR SURFACE COATINGS

[75] Inventors: Jean-Pascal Planche, Saint Just Chaleyssin; Patrick Turello, Francheville, both of France

[73] Assignee: Elf Exploration Production, LaDefense, France

[21] Appl. No.: 849,865

[22] PCT Filed: Oct. 15, 1996

[86] PCT No.: PCT/FR96/01605

§ 371 Date: Aug. 22, 1997

§ 102(e) Date: Aug. 22, 1997

[87] PCT Pub. No.: WO97/14753

PCT Pub. Date: Apr. 24, 1997

[30] Foreign Application Priority Data

Oct. 16, 1995 [FR] France .................................. 95 12086

[51] Int. Cl.⁶ ............................. C08L 95/00; C09J 3/22; C09J 3/24
[52] U.S. Cl. .............................. 524/68; 523/351; 524/59; 524/62
[58] Field of Search ................................ 524/59, 62, 68, 524/69, 70, 71; 523/351

[56] References Cited

U.S. PATENT DOCUMENTS 5,070,123  12/1991  Lyle ......................................... 524/69
5,565,510  10/1996  Giavarani et al. ........................ 524/59

FOREIGN PATENT DOCUMENTS 0096638  12/1983  European Pat. Off. .
0157210  10/1985  European Pat. Off. .
2528439  12/1983  France .
2703064   9/1994  France .
9422958  10/1994  France .
2255173   5/1974  Germany .

*Primary Examiner*—Peter A. Szekely
*Attorney, Agent, or Firm*—Burgess, Ryan & Wayne

[57] ABSTRACT

Bitumen/polymer compositions with a broadened plasticity range are produced by contacting a bitumen or bitumen mixture with a sulphur-cross-linkable elastomer and a sulphur-donating coupling agent, at 100°–230° C. and under stirring conditions, to produce a cross-linked bitumen/polymer composition, then adding to the composition, maintained at 100°–232° C. and under stirring conditions, an acidic additive selected from polyphosphoric acids, acids of formula $R-(COO)_t-SO_3H$ wherein $t=0$ or $1$ and $R$ is a monovalent hydrocarbyl radical having up to 12 carbon atoms, and mixtures of both types of acid separately or jointly with sulphuric acid, and maintaining the resulting reaction medium at 100°–230° C. and under stirring conditions for at least ten minutes. The bitumen/polymer compositions may be used directly or in diluted form to produce bituminous binders for making road surfaces, coated materials or sealing coatings.

38 Claims, No Drawings

METHOD FOR PREPARING REINFORCED MULTIGRADE BITUMEN/POLYMER AND USE OF THE RESULTING COMPOSITIONS FOR PRODUCING BITUMEN/POLYMER BINDERS FOR SURFACE COATINGS

BACKGROUND OF THE INVENTION

1. Field of the Invention

The invention relates to a process for the preparation of bitumen/polymer compositions with a reinforced multigrade nature. It further relates to the application of the compositions obtained to the production of bitumen/polymer binders for coatings and in particular for road surfacings or for watertight facings.

Bitumen/polymer compositions with a reinforced multigrade nature is understood to mean, according to the invention, bitumen/polymer compositions which exhibit a wide plasticity range. The said range is defined as the difference between the ring-and-ball softening temperature (abbreviated to RBT), which reveals the hot properties of the binder or bitumen/polymer composition, and the Fraass brittleness point, which reveals the cold properties of the bitumen/polymer composition. The bituminous binder consisting of/or based on the bitumen/polymer composition will become increasingly resistant to hot stresses and cold stresses as the plasticity range widens.

The ring-and-ball softening temperature (RBT) and Fraass brittleness point quantities mentioned above are determined from standardized procedures as indicated hereinbelow:

ring-and-ball softening temperature:
  determined according to NF Standard T 66 008 and expressed in °C.;
Fraass brittleness point:
  determined according to NF Standard T 66026 and expressed in °C.

2. Background Art

A process for the preparation of bitumen/polymer compositions with a reinforced multigrade nature is described in French Patent Application No. 94 04577 of 18.04.1994 on behalf of the Applicant Company. This process comprises bringing a bitumen or mixture of bitumens into contact, the operation being carried out at temperatures of between 100° C. and 230° C. and with stirring for a period of time of at least 10 minutes, with, with respect to the weight of the bitumen or mixture of bitumens, 0.5% to 20% and preferably 0.7% to 15% of a sulphur-crosslinkable elastomer and a sulphur-donor coupling agent in an amount capable of providing an amount of free sulphur representing 0.1% to 20% and preferably 0.5% to 10% of the weight of the sulphur-crosslinkable elastomer in the reaction mixture formed from the ingredients bitumen or mixture of bitumens, elastomer and coupling agent, in order to produce a sulphur-crosslinked composition, and then incorporating in the reaction mixture resulting from the vulcanization with sulphur, which is maintained at a temperature between 100° C. and 230° C. and with stirring, 0.005% to 5% and preferably 0.1% to 2.5%, by weight of the bitumen, of an acidic adjuvant comprising at least one compound chosen from the group formed by phosphoric acids, boric acids, sulphuric acid, the anhydrides of the said acids and chlorosulphuric acid and in maintaining the reaction mixture containing the acidic adjuvant at a temperature of between 100° C. and 230° C. and with stirring for a period of time of at least 20 minutes. The acidic adjuvant which can be employed in the process of French Patent Application No. 94 04577 can comprise in particular one or a number of the compounds chosen from $H_3PO_4$, $P_2O_5$, $H_3BO_3$, $B_2O_3$, $H_2SO_4$, $SO_3$ and $HSO_3Cl$.

SUMMARY OF THE INVENTION

On continuing its research studies, the Applicant Company has demonstrated that the process of the above-mentioned patent application could also be efficiently employed and could even result in improved performances by using, as acidic adjuvant, specific acidic components not disclosed in the said patent application.

The subject of the invention is thus a process for the preparation of bitumen/polymer compositions with a reinforced multigrade nature, of the type in which a bitumen or mixture of bitumens is brought into contact, the operation being carried out at temperatures of between 100° C. and 230° C. and with stirring for a period of time of at least 10 minutes, with, with respect to the weight of the bitumen or mixture of bitumens, 0.5% to 20% and preferably 0.7% to 15% of a sulphur-crosslinkable elastomer and a sulphur-donor coupling agent in an amount capable of providing an amount of free sulphur representing 0.1% to 20% and preferably 0.5 to 10% of the weight of the sulphur-crosslinkable elastomer in the reaction mixture formed from the ingredients bitumen or mixture of bitumens, elastomer and coupling agent, in order to produce a sulphur-crosslinked composition, 0.005% to 5% and preferably 0.01% to 2.5%, by weight of the bitumen or mixture of bitumens, of an acidic adjuvant is then incorporated in the reaction mixture resulting from the crosslinking with sulphur which is maintained at a temperature of between 100° C. and 230° C. and with stirring and the reaction mixture containing the acidic adjuvant is maintained at a temperature of between 100° C. and 230° C. and with stirring for a period of time of at least 10 minutes, the said process being characterized in that the acidic adjuvant is chosen from polyphosphoric acids, acids of formula $R—(COO)_t—SO_3H$, where t is zero or one and R is a $C_1$ to $C_{12}$ hydrocarbyl radical, mixtures of at least one polyphosphoric acid and of sulphuric acid, mixtures of at least one polyphosphoric acid and of at least one of the said acids $R—(COO)_t—SO_3H$, mixtures of sulphuric acid and of at least one of the acids $R—(COO)_t—SO_3H$ and mixtures of sulphuric acid with at least one polyphosphoric acid and at least one of the acids $R—(COO)_t—SO_3H$.

DESCRIPTION OF THE PREFERRED EMBODIMENTS

The acidic adjuvant is advantageously composed of a combination containing, by weight, 5% to 100% and more particularly 20% to 100% of one or a number of polyphosphoric acids and 95% to 0% and more particularly 80% to 0% of at least one compound chosen from the group formed from sulphuric acid and the said acids $R—(COO)_t—SO_3H$. The acidic adjuvant very especially is composed of a combination comprising, by weight, 20% to 95% and more particularly 40% to 90% of one or a number of polyphosphoric acids and 80% to 5% and more particularly 60% to 10% of sulphuric acid and/or of methanesulphonic acid.

When the acidic adjuvant is composed of a plurality of acidic compounds, for example combination of a polyphosphoric acid and of sulphuric acid, the said compounds can be incorporated either as a mixture or successively into the reaction mixture resulting from the crosslinking with sulphur.

The polyphosphoric acids which can be used in the process according to the invention are compounds of empirical formula $P_qH_rO_s$ in which q, r and s are positive numbers such that $q \geq 2$ and in particular ranging from 3 to 20 or more and such that $5q+r-2s=0$.

In particular, the said polyphosphoric acids can be linear compounds of empirical formula $P_qH_{q+2}O_{3q+1}$ corresponding to the expanded formula

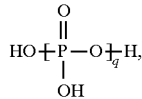

above, or can alternatively be products with a two-dimensional structure, indeed even three-dimensional structure. All these polyphosphoric acids can be regarded as polycondensation products from heating aqueous metaphosphoric acid.

The acids of formula $R-(COO)_t-SO_3H$ are either sulphonic acids of formula $R-SO_3H$, when t=0, or else acids of formula $R-COO-SO_3H$, when t=1. The acids of formula $R-COO-SO_3H$ can be regarded as adducts of monocarboxylic acids, $R-COOH$ and of $S_3$ or alternatively as mixed anhydrides of monocarboxylic acids of formula $R-COOH$ and of sulphuric acid. In these acids of formula $R-(COO)_t-SO_3H$, the radical R is a $C_1$ to $C_{12}$ and more especially $C_1$ to $C_8$ hydrocarbyl radical. The said radical R can in particular comprise a linear or branched $C_1$ to $C_{12}$ and more especially $C_1$ to $C_8$ alkyl radical, in particular methyl, ethyl, propyl, butyl, hexyl or octyl, a $C_4$ to $C_{12}$ and more particularly $C_6$ to $C_8$ cycloalkyl radical or alternatively a monovalent $C_6$ to $C_{12}$ and more especially $C_6$ to $C_8$ aromatic radical, in particular phenyl or tolyl, for the aromatic radical, and cyclohexyl, cyclopentyl or cycloheptyl for the cycloalkyl radical. Examples of sulphonic acids of formula $R-SO_3H$ which can be employed in the process according to the invention are such as methanesulphonic acid, ethanesulphonic acid, propanesulphonic acid, benzenesulphonic acid and toluenesulphonic acid and very especially methanesulphonic acid and ethanesulphonic acid. Mention may be made, as acids of formula $R-COO-SO_3H$, of the acids $CH_3-COO-SO_3H$ and $CH_3-CH_2-COOSO_3H$, which are adducts of $SO_3$ with acetic acid and propionic acid respectively.

The bitumen, or mixture of bitumens, which is employed for the implementation of the process according to the invention is advantageously chosen from the various bitumens which have a kinematic viscosity at 100° C. of between $0.5 \times 10^{-4}$ m²/s and $3 \times 10^{-2}$ m²/s and preferably between $1 \times 10^{-4}$ m²/s and $2 \times 10^{-2}$ m²/s. These bitumens may be direct distillation or vacuum distillation bitumens or else blown or semiblown bitumens, propane or pentane deasphalting residues, viscosity breaking residues, indeed even some petroleum cuts or mixtures of bitumens and of vacuum distillates or alternatively mixtures of at least two of the products which have just been listed. Besides a kinematic viscosity included within the abovementioned ranges, the bitumen or mixture of bitumens employed in the process according to the invention advantageously has a penetrability at 25° C., defined according to NF Standard T 66004, of between 5 and 800 and preferably between 10 and 400.

The elastomer which is employed in the process according to the invention can be composed of one or a number of elastomeric polymers, such as polyisoprene, polynorbornene, polybutadiene, butyl rubber, random ethylene/propylene (EP) copolymers or random ethylene/propylene/diene (EPDM) terpolymers. The said elastomer is advantageously composed partially, the remaining part being composed of one or a number of polymers as mentioned above or other polymers, or entirely of one or a number of random or block copolymers of styrene and of a conjugated diene, such as butadiene, isoprene, chloroprene, carboxylated butadiene or carboxylated isoprene, and more particularly of one or a number of copolymers chosen from block copolymers, with or without a random hinge, of styrene and of butadiene, of styrene and of isoprene, of styrene and of chloroprene, of styrene and of carboxylated butadiene or alternatively of styrene and of carboxylated isoprene. The copolymer of styrene and of conjugated diene, and in particular each of the abovementioned copolymers, advantageously has a styrene content by weight ranging from 5% to 50%. The weight-average molecular weight of the copolymer of styrene and of conjugated diene, and in particular that of the abovementioned copolymers, can be, for example, between 10,000 and 600,000 daltons and preferably lies between 30,000 and 400,000 daltons. The copolymer of styrene and of conjugated diene is preferably chosen from di- or tri-block copolymers of styrene and of butadiene, of styrene and of isoprene, of styrene and of carboxylated butadiene or alternatively of styrene and of carboxylated isoprene which have styrene contents and weight-average molecular weights which lie within the ranges defined above.

The sulphur-donor coupling agent which is employed in the preparation of the bitumen/polymer compositions according to the invention may be composed of a product chosen from the group formed by elemental sulphur, hydrocarbyl polysulphides, sulphur-donor vulcanization accelerators or mixtures of such products with one another and/or with vulcanization accelerators which are not sulphur donors. In particular, the sulphur-donor coupling agent is chosen from the products M, which contain, by weight, from 0% to 100% of a component A composed of one or a number of sulphur-donor vulcanization accelerators and from 100% to 0% of a component B composed of one or a number of vulcanizing agents chosen from elemental sulphur and hydrocarbyl polysulphides, and the products N, which contain a component C composed of one or a number of vulcanization accelerators which are not sulphur donors and a product M in a ratio by weight of the component C to the product M ranging from 0.01 to 1 and preferably from 0.05 to 0.5.

The elemental sulphur capable of being employed for constituting, partially or entirely, the coupling agent is advantageously sulphur in flower form and preferably sulphur crystallized in the orthorhombic form and known by the name of alpha sulphur.

The hydrocarbyl polysulphides capable of being employed to form a proportion or all of the coupling agent may be chosen from those defined in reference FR-A-2,528,439 and corresponding to the general formula

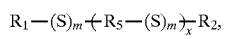

denote a saturated or unsaturated $C_1$ to $C_{20}$ monovalent hydrocarbon radical or are connected to one another to constitute a saturated or unsaturated $C_1$ to $C_{20}$ divalent hydrocarbon radical forming a ring with the other groups of atoms associated in the formula, $R_5$ is a saturated or unsaturated $C_1$ to $C_{20}$ divalent hydrocarbon radical, the $-(S)_m-$ groups represent divalent groups each formed from m sulphur atoms, the values m being able to differ from one of the said groups to another and denoting integers ranging from 1 to 6 with at least one of the values of m equal to or greater than 2 and x represents an integer assuming values from zero to 10. Preferred polysulphides correspond to the formula $R_3$—$(S)_p$—$R_3$ in which $R_3$ denotes a $C_6$ to $C_{16}$ alkyl radical, for example hexyl, octyl, dodecyl, tert-dodecyl, hexadecyl, nonyl or decyl, and —$(S)_p$— represents a divalent group formed from a chain sequence of p sulphur atoms, p being an integer ranging from 2 to 5.

When the coupling agent contains a sulphur-donor vulcanization accelerator, the latter may be chosen in particular from the thiuram polysulphides of formula

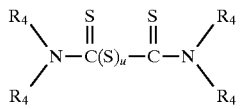

in which the symbols $R_4$, which are identical or different, each represent a $C_1$ to $C_{12}$ and preferably $C_1$ to $C_8$ hydrocarbon radical, especially an alkyl, cycloalkyl or aryl radical, or else two $R_4$ radicals attached to the same nitrogen atom are bonded together to form a $C_2$ to $C_8$ divalent hydrocarbon radical and u is a number ranging from 2 to 8. As examples of such vulcanization accelerators, there may be mentioned especially the compounds: dipentamethylenethiuram disulphide, dipentamethylenethiuram tetrasulphide, dipentamethylenethiuram hexasulphide, tetrabutylthiuram disulphide, tetraethylthiuram disulphide and tetramethylthiuram disulphide.

As other examples of sulphur-donor vulcanization accelerators, there may also be mentioned alkylphenol disulphides and disulphides such as morpholine disulphide and N,N'-caprolactam disulphide.

Vulcanization accelerators which are not sulphur donors and which can be employed for forming the component C of the coupling agents of the product N type may be sulphur compounds chosen especially from mercaptobenzothiazole and its derivatives, especially benzothiazole metal thiolates and above all benzothiazolesulphenamides, dithiocarbamates of formula

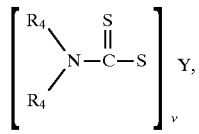

are identical or different, have the meaning given above, Y represents a metal and v denotes the valency of Y, and thiuram monosulphides of formula

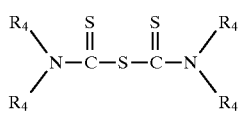

in which the symbols $R_4$ have the meaning given above.

Examples of vulcanization accelerators of the mercaptobenzothiazole type may be such as mercaptobenzothiazole, benzothiazole thiolate of a metal such as zinc, sodium or copper, benzothiazyl disulphide, 2-benzothiazolepentamethylenesulphenamide, 2-benzothiazolethiosulphenamide, 2-benzothiazoledihydrocarbylsulphenamides in the case of which the hydrocarbyl radical is an ethyl, isopropyl, tert-butyl or cyclohexyl radical, and N-oxo-diethylene-2-benzothiazolesulphenamide.

Among the vulcanization accelerators of the dithiocarbamate type of the abovementioned formula, there may be mentioned the compounds which are dimethyldithiocarbamates of metals such as copper, zinc, lead, bismuth and selenium, diethyldithiocarbamates of metals such as cadmium and zinc, diamyldithiocarbamates of metals such as cadmium, zinc and lead, and lead or zinc pentamethylenedithiocarbamate.

By way of examples of thiuram monosulphides which have the formula given above, there may be mentioned compounds such as dipentamethylenethiuram monosulphide, tetramethylthiuram monosulphide, tetraethylthiuram monosulphide and tetrabutylthiuram monosulphide.

Other vulcanization accelerators which are not sulphur donors and which do not belong to the classes defined above may also be employed. Such vulcanization accelerators may be such as 1,3-diphenylguanidine, diortho-tolylguanidine and zinc oxide, it being possible for the latter compound to be employed optionally in the presence of fatty acids of the stearic acid, lauric acid or ethylcaproic acid type.

For further details on the sulphur-donor vulcanization accelerators and those which are not sulphur donors which can be employed in the constitution of the coupling agent, reference may be made to citations EP-A-0,360,656 and EP-A-0,409,683, the contents of which are incorporated in the present description by reference, as are the contents of citation FR-A-2,528,439.

As follows from its composition, as indicated above, the coupling agent may be of the single-component or of the multicomponent type, it being possible for the coupling agent of the multicomponent type to be formed before it is employed or alternatively produced in situ in the mixture in which it must be present. The coupling agent of the preformed multicomponent type or of the single-component type or the components of the coupling agent of the multicomponent type formed in situ may be used as they are, for example in the molten state, or else as a mixture, for example in solution or in suspension, with a diluent, for example a hydrocarbon compound.

The process for the preparation of the bitumen/polymer compositions according to the invention is advantageously employed by first of all bringing the sulphur-crosslinkable elastomer into contact with the bitumen or mixture of bitumens, use being made of a proportion of elastomer, with respect to the bitumen or mixture of bitumens, chosen as defined above for this proportion, the operation being carried out at temperatures of between 100° C. and 230° C., more particularly between 120° C. and 190° C., and with stirring, for a sufficient period of time, generally of the order of a few tens of minutes to a few hours and for example of the order of 1 hour to 8 hours, to form a homogeneous mixture, by then incorporating, in the said mixture, the sulphur-donor coupling agent in an appropriate amount chosen within the ranges defined above for the said amount and by maintaining the whole mixture with stirring at temperatures of between 100° C. and 230° C., more particularly between 120° C. and 190° C., and identical or not to the temperatures for mixing the elastomer with the bitumen or mixture of bitumens, for a period of time of at least 10 minutes and generally ranging from 10 minutes to 5 hours, more particularly from 30 minutes to 180 minutes, in order to form a reaction product constituting the crosslinked bitumen/polymer composition, and, finally, the acidic adjuvant is incorporated, in the desired amount chosen within the ranges defined above for the said amount, in the said reaction product, maintained at a temperature of between 100° C. and 230° C., more particularly between 120° C. and 190° C., and with stirring, and the reaction mixture containing the acidic adjuvant is maintained at a temperature of between 100° C. and 230° C., more particularly between 120° C. and 190° C., and with stirring, for a period of time ranging from 10 minutes to 5 hours, more particularly from 30 minutes to 4 hours, in order to form the bitumen/polymer composition with an expanded plasticity range.

The reaction mixture formed from the bitumen or mixture of bitumens, from the sulphur-crosslinkable elastomer and from the sulphur-donor coupling agent, which results in the crosslinked bitumen/polymer composition which is then subjected to the action of the acidic adjuvant, may further have added to it 1% to 40% and more particularly 2% to 30%, by weight of the bitumen, of a fluxing agent which may be composed, in particular, of a hydrocarbon oil which has an atmospheric pressure distillation range, determined according to ASTM Standard D 86-67, of between 100° C. and 600° C. and lying more especially between 150° C. and 400° C. This hydrocarbon oil, which may especially be a petroleum cut of aromatic nature, a petroleum cut of naphtheno-aromatic nature, a petroleum cut of naphtheno-paraffinic nature, a petroleum cut of paraffinic nature, a coal oil or alternatively an oil of plant origin, is sufficiently "heavy" to limit the evaporation at the time of its addition to the bitumen and, at the same time, sufficiently "light" to be removed as much as possible after the bitumen/polymer composition containing it has been spread, so as to regain the same mechanical properties which the bitumen/polymer composition prepared without employing any fluxing agent would have exhibited after hot spreading. The fluxing agent may be added to the reaction mixture, which is formed from the bitumen, the sulphur-crosslinkable elastomer and the sulphur-donor coupling agent, at any time in the constitution of the said reaction mixture, the amount of fluxing agent being chosen within the ranges defined above, in order to be compatible with the desired final use on the work site.

It is also possible to add, to the reaction mixture formed from the bitumen or mixture of bitumens, the sulphur-crosslinkable elastomer, the sulphur-donor coupling agent and optionally the fluxing agent, which serves to produce the crosslinked bitumen/polymer composition which is subsequently treated with the acidic adjuvant, various additives at any time in the constitution of the said reaction mixture and in particular nitrogenous compounds of the amine or amide type, such as those defined in the citation EP-A-0409683, as promoters of adhesion of the final bitumen/polymer composition to the mineral surfaces, the said nitrogenous compounds being incorporated in the said reaction mixture, preferably, before the addition of the sulphur-donor coupling agent to this reaction mixture, so that these nitrogenous compounds are grafted onto the crosslinked elastomer present in the final bitumen/polymer composition. The mixture composed of bitumen or mixture of bitumens, of the sulphur-crosslinkable elastomer, of the sulphur-donor coupling agent and optionally of the fluxing agent, from which the crosslinked bitumen/polymer composition is formed which is subsequently subjected to the action of the acidic adjuvant, can also contain, by weight of the bitumen or mixture of bitumens, 0.1% to 5% and preferably 0.2% to 3% of an antigelling additive, added to the said mixture advantageously before the incorporation of the sulphur-donor coupling agent, which antigelling additive corresponds to the formula $R_6$-X, in which $R_6$ is a saturated or unsaturated, $C_2$ to $C_{50}$ and more particularly $C_2$ to $C_{40}$, monovalent hydrocarbon radical, for example an alkyl, alkenyl, alkylaryl, alkadienyl or alkatrienyl radical or alternatively a radical of the polycyclic type containing condensed rings, and X represents a functional

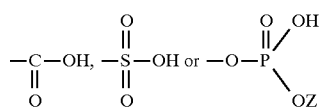

with Z denoting a hydrogen atom or a radical $R_6$. The antigelling additive can be chosen in particular from carboxylic acids containing a saturated or unsaturated fatty chain, in particular pelargonic acid, lauric acid, stearic acid, palmitic acid or oleic acid, alkylarenesulphonic acids carrying one or two saturated or unsaturated fatty chains on the ring, in particular nonylenzenesulphonic acid, dodecylbenzenesulphonic acid or didodecylbenzenesulphonic acid, polycyclic acids containing condensed rings, in particular abietic acid and resin acids deriving therefrom, monohydrocarbyl esters and dihydrocarbyl esters of phosphoric acid, also known as monohydrocarbyl phosphoric and dihydrocarbyl phosphoric acids, in particular monoalkyl phosphoric acids and dialkyl phosphoric acids for which the alkyl radical is a $C_2$ to $C_{18}$ alkyl radical, for example ethyl, 2-ethylhexyl, octyl, nonyl, decyl, dodecyl, hexadecyl or octadecyl, mixtures of carboxylic acids containing a fatty chain and mixtures of abietic or resin acids and of carboxylic acids containing a fatty chain.

In one embodiment of the process according to the invention employing a hydrocarbon oil as defined above as fluxing agent, the sulphur-crosslinkable elastomer and the sulphur-donor coupling agent are incorporated in the bitumen or mixture of bitumens in the form of a mother solution of these products in the hydrocarbon oil constituting the fluxing agent.

The mother solution is prepared by bringing into contact the ingredients of which it is composed, namely hydrocarbon oil acting as solvent, elastomer and coupling agent, with stirring, at temperatures of between 10° C. and 170° C. and more particularly between 40° C. and 120° C., for a sufficient period of time, for example from approximately 30 minutes to approximately 90 minutes, to obtain complete dissolution of the elastomer and of the coupling agent in the hydrocarbon oil.

The respective concentrations of the elastomer and of the coupling agent in the mother solution may vary quite widely, especially as a function of the nature of the hydrocarbon oil employed for dissolving the elastomer and the coupling agent. Thus, the respective amounts of elastomer and of coupling agent may advantageously represent 5% to 40% and 0.02% to 15% of the weight of the hydrocarbon oil. A preferred mother solution contains, with respect to the weight of the hydrocarbon oil employed as solvent, 10% to 35% of elastomer and 0.1% to 5% of coupling agent.

To prepare the bitumen/polymer compositions according to the invention by producing, by the mother solution technique, the sulphur-crosslinked bitumen/polymer composition which is subsequently subjected to the action of the acidic adjuvant, the mother solution of the elastomer and of the coupling agent is mixed with the bitumen or mixture of bitumens, the mixing being carried out at a temperature of between 100° C. and 230° C. and with stirring, this being done, for example, by adding the mother solution to the bitumen or mixture of bitumens maintained with stirring at a temperature of between 100° C. and 230° C., the resulting mixture is then maintained with stirring at a temperature of between 100° C. and 230° C., for example at the temperature employed for mixing the mother solution with the bitumen or mixture of bitumens, for a period of time of at least 10 minutes and generally ranging from 10 minutes to 90 minutes, in order to form a reaction product constituting the crosslinked bitumen/polymer composition, and, finally, the acidic adjuvant is incorporated, in the desired amount chosen within the ranges defined above for the said amount, in the said reaction product, maintained at a temperature of between 100° C. and 230° C., more particularly between 120° C. and 190° C., and with stirring, and the reaction mixture containing the acidic adjuvant is maintained at a temperature of between 100° C. and 230° C., more particularly between 120° C. and 190° C., and with stirring, for a period of time ranging from 10 minutes to 5 hours, more particularly from 30 minutes to 4 hours, in order to form the bitumen/polymer composition with an expanded plasticity range.

The amount of mother solution mixed with the bitumen or mixture of bitumens is chosen to yield the desired amounts, with respect to the bitumen or mixture of bitumens, of elastomer and of coupling agent, the said amounts being within the ranges defined above.

One embodiment which is particularly preferred for the preparation, by the mother solution technique, of the sulphur-crosslinked bitumen/polymer composition which is subsequently subjected to the action of the acidic adjuvant comprises bringing from 80% to 95% by weight of bitumen or mixture of bitumens into contact, at a temperature of between 100° C. and 230° C. and with stirring, with 20% to 5% by weight of the mother solution, the latter containing, by weight of the hydrocarbon oil acting as solvent, 10% to 35% of elastomer and 0.1% to 5% of coupling agent, and in then maintaining the mixture thus obtained with stirring at a temperature of between 100° C. and 230° C., and preferably at the temperature employed for bringing the bitumen or mixture of bitumens into contact with the mother solution, for a period of time of at least 10 minutes and preferably ranging from 10 minutes to 60 minutes.

The bitumen/polymer compositions with a reinforced multigrade nature, that is to say with an expanded plasticity range, obtained by the process according to the invention may be employed as they are or else diluted with variable proportions of a bitumen or a mixture of bitumens or of a composition according to the invention which has different characteristics, in order to constitute bitumen/polymer binders which have a chosen content of crosslinked elastomer which may be either equal to (undiluted composition) or else lower than (diluted composition) the content of crosslinked elastomer in the corresponding initial bitumen/polymer compositions. The dilution of the bitumen/polymer compositions according to the invention with the bitumen or mixture of bitumens or with a composition according to the invention of different characteristics may be carried out either directly following the preparation of the said compositions, when a virtually immediate use of the resulting bitumen/polymer binders is required, or else alternatively after a more or less extended period of storage of the bitumen/polymer compositions, when a delayed use of the resulting bitumen/polymer binders is envisaged. The bitumen or mixture of bitumens employed for the dilution of a bitumen/polymer composition according to the invention may be chosen from the bitumens defined above as being suitable for the preparation of the bitumen/polymer compositions. If appropriate, the bitumen or mixture of bitumens employed for the dilution may itself have been pretreated with an acidic adjuvant according to the invention.

The dilution of a bitumen/polymer composition according to the invention with a bitumen or mixture of bitumens or with a second composition according to the invention with a lower content of crosslinked elastomer, in order to form a bitumen/polymer binder with a desired content of crosslinked elastomer which is lower than that in the bitumen/polymer composition to be diluted, is generally carried out by bringing into contact, with stirring at temperatures of between 100° C. and 230° C. and more particularly between 120° C. and 190° C., suitable proportions of the bitumen/polymer composition to be diluted and of bitumen or mixture of bitumens or of second bitumen/polymer composition according to the invention. For example, the amount of bitumen or mixture of bitumens or of second bitumen/polymer composition employed for the dilution may be chosen so that the bitumen/polymer binder resulting from the dilution contains a content of crosslinked elastomer of between 0.5% and 5%, more particularly between 0.7% and 3%, by weight of the bitumen, and lower than the content of crosslinked elastomer in the bitumen/polymer composition according to the invention which is subjected to the dilution.

The bitumen/polymer binders consisting of the bitumen/polymer compositions according to the invention or resulting from the dilution of the said compositions with a bitumen or mixture of bitumens or with another bitumen/polymer composition according to the invention, as far as the desired content of crosslinked elastomer in the said binders, can be applied, directly or after conversion into aqueous emulsion, to the production of road surfacings of the surface coating type, to the production of bituminous mixes which are put in place with heating or cold, or else to the production of watertight facings.

The invention is illustrated by the following examples, given without any limitation being implied.

In these examples, the amounts and percentages are expressed by weight, except when otherwise indicated.

In addition, the rheological and mechanical characteristics of the bitumens or of the bitumen/polymer compositions to which reference is made in the said examples are as follows:

penetrability, expressed in $1/10$ of an mm and determined according to NF Standard T 66004, ring-and-ball softening temperature, expressed in °C. and determined by the ring-and-ball test defined by NF Standard T 66008, tensile rheological characteristics, determined according to NF Standard T 46002 and comprising the quantities:
elongation at break $\epsilon b$, in %,
breaking stress $\sigma b$, in daN/cm$^2$, Pfeiffer's number (abbreviated to PN), calculated from the relationship $$PN = \frac{20 - 500A}{1 + 50A} \text{ with } A = \frac{\log_{10} 800 - \log_{10} pen}{RBT\text{-}25},$$

where "pen" and "RBT" respectively denote the penetrability and the ring-and-ball temperature as defined above, this number providing an indication of the temperature susceptibility of the composition.

EXAMPLES 1 TO 10

Control bitumen/polymer compositions (Examples 1, 2, 6 and 7) and bitumen/polymer compositions according to the invention (Examples 3 to 5 and 8 to 10) were prepared, in order to evaluate and compare the physicomechanical characteristics thereof.

The preparations were carried out under the following conditions.

Example 1 (control):

Preparation of a sulphur-crosslinked bitumen/polymer composition untreated with the acidic adjuvant.

964 parts of a bitumen having a penetrability, determined according to the conditions of NF Standard T 66004, of 82 and 35 parts of a block copolymer of styrene and of butadiene having a weight-average molecular mass of 100,000 daltons and containing 25% of styrene were introduced into a reactor maintained at 175° C. and with stirring. After mixing for 2.5 hours with stirring at 175° C., a homogeneous mass was obtained.

1 part of crystalline sulphur was then added to the abovementioned homogeneous mass maintained at 175° C. and the combined mixture was stirred at the said temperature for a further 3 hours in order to form a crosslinked bitumen/polymer composition.

Example 2 (control):

Preparation of a sulphur-crosslinked bitumen/polymer composition subsequently treated with $H_2SO_4$.

A bitumen/polymer composition was prepared as described in Example 1 and, once the reaction of crosslinking with sulphur was complete, 10 parts of 90% sulphuric acid were added to the contents of the reactor and then the reaction mixture thus formed was maintained at 175° C. and with stirring for a period of time of 2 hours.

Example 3 (according to the invention):

Preparation of a sulphur-crosslinked bitumen/polymer composition subsequently treated with a polyphosphoric acid.

A bitumen/polymer composition was prepared as described in Example 1 and, once the reaction of crosslinking with sulphur was complete, 10 parts of a polyphosphoric acid were added to the contents of the reactor and then the reaction mixture thus formed was maintained at 175° C. and with stirring for a period of time of 2 hours. The polyphosphoric acid employed corresponded to the formula $P_nH_{n+2}O_{3n+1}$, n being a number equal to approximately 3.

Example 4 (according to the invention):

Preparation of a sulphur-crosslinked bitumen/polymer composition subsequently treated with a polyphosphoric acid and $H_2SO_4$.

The preparation was carried out as described in Example 3, the 10 parts of polyphosphoric acid being replaced, however, by 6 parts of a mixture containing 85% of polyphosphoric acid and 15% of sulphuric acid, the said mixture being preformed before being added to the contents of the reactor.

Example 5 (according to the invention):

Preparation of a sulphur-crosslinked bitumen/polymer composition subsequently treated with a polyphosphoric acid and $H_2S_{SO4}$ added successively.

A bitumen/polymer composition was prepared as described in Example 1, and, once the reaction of crosslinking with sulphur was complete, 5 parts of a polyphosphoric acid corresponding to that employed in Example 3, followed by 1 part of 90% sulphuric acid, were added to the contents of the reactor and the reaction mixture thus formed was maintained at 175° C. and with stirring for 2 hours.

Examples 6 to 10:

Preparation of diluted control bitumen/polymer compositions and of diluted bitumen/polymer compositions according to the invention.

The bitumen/polymer compositions prepared as described in Control Examples 1 and 2 and Examples 3 to 5 according to the invention were diluted with the same bitumen as that defined in Example 1 to a final content of 1.5% of polymer in the diluted composition. The dilution operation was carried out at 175° C. and with stirring and each diluted composition formed at the end of addition of the dilution bitumen was maintained with stirring at 175° C. for a further period of time of one hour in order to complete its homogenization. The diluted bitumen/polymer compositions of Examples 6 to 10 were obtained by dilution of the bitumen/polymer compositions according to Examples 1 to 5 respectively.

For each of the bitumen/polymer compositions obtained as indicated in Examples 1 to 10, the following characteristics were determined:

penetrability at 25° C. (Pen. 25), ring-and-ball softening temperature (RBT),

Fraass point (Fraass),

Pfeiffer's number (PN), tensile rheological characteristics, namely:
  breaking stress ($\sigma b$),
  elongation at break ($\epsilon b$)

The results obtained are collated in the following table.

TABLE

| Examples | Order of introduction | Pen. 25 (0.1 mm) | RBT (°C.) | Fraass (°C.) | PN | Tension at 20° C. Rate = 500 mm/min | | Tension at 5° C. Rate = 500 mm/min | |
|---|---|---|---|---|---|---|---|---|---|
| | | | | | | $\sigma(b)$ | $\epsilon b$ (%) | $\sigma(b)$ | $\epsilon b$ (%) |
| 1 | B + P + R | 68 | 56 | −24 | 1 | 0.98 | >700 | 6.7 | >700 |
| 2 | B + P + R + SA | 47 | 69 | −26 | 2.5 | 1.7 | >700 | 7.5 | >700 |
| 3 | B + P + R + PA | 48 | 68 | −25 | 2.4 | 1.6 | >700 | 7.3 | >700 |
| 4 | B + P + R + (PA + SA) | 55 | 69 | −30 | 2.9 | 1.6 | >700 | 7.6 | >700 |
| 5 | B + P + R + PA + SA | 54 | 71 | −32 | 3.2 | 1.9 | >700 | | >700 |
| 6 | B + P + R + B | 69 | 50 | −15 | −0.4 | 0.24 | >700 | 3.0 | >700 |
| 7 | B + P + R + SA + B | 65 | 55 | −22 | 0.6 | 0.6 | >700 | 3.2 | >700 |
| 8 | B + P + R + PA + B | 64 | 54 | −17 | 0.4 | 0.55 | >700 | 3.1 | >700 |
| 9 | B + P + R + (PA + SA) + B | 68 | 56 | −25 | 1 | 0.7 | >700 | 3.3 | >700 |
| 10 | B + P + R + PA + SA + B | 68 | 57 | −26 | 1.2 | 0.8 | >700 | 3.5 | >700 |

Order of introduction: Order of introduction of the constituents of the bitumen/polymer composition
B = bitumen;
P = block copolymer;
R = coupling agent (sulphur);
PA = polyphosphoric acid;
SA = sulphuric acid
$\sigma(b)$ expressed in daN/cm$^2$ In the light of the characteristics collated in the table, it is apparent that:

the bitumen/polymer compositions obtained after treatment with the acidic adjuvant have properties, in particular a temperature susceptibility evaluated by the Pfeiffer's number, which are markedly improved with respect to those of the corresponding bitumen/polymer compositions not treated with the acidic adjuvant;

the use of an acidic adjuvant of the polyphosphoric acid type results in the production of undiluted or diluted bitumen/polymer compositions with a broad plasticity range which have physicomechanical characteristics comparable with those of the corresponding undiluted or diluted bitumen/polymer compositions produced by employing $H_2SO_4$ as acidic adjuvant;

the use of an acidic adjuvant resulting from the combination of a polyphosphoric acid and of sulphuric acid, either premixed or added successively to the reaction mixture., is more effective in terms of physicomechanical properties of the bitumen/polymer compositions produced, and for a lower overall content, than the polyphosphoric acid or the sulphuric acid employed alone.

We claim:

1. A process for the preparation of bitumen/polymer compositions with a reinforced multigrade nature, in which a bitumen or a mixture of bitumens is brought into contact, the operation being carried out at temperatures of between 100° C. and 230° C. and with stirring for a period of time of at least 10 minutes, with, with respect to the weight of the bitumen or mixture of bitumens, 0.5% to 20% of a sulphur-crosslinkable elastomer and a sulphur-donor coupling agent in an amount capable of providing an amount of free sulphur representing 0.1% to 20% of the weight of the sulphur-crosslinkable elastomer in the reaction mixture formed from the ingredients bitumen or mixture of bitumens, elastomer and coupling agent, in order to produce a sulphur-crosslinked composition, 0.005% to 5%, by weight of the bitumen or mixture of bitumens, of an acidic adjuvant being then incorporated in the reaction mixture resulting from the crosslinking with sulphur which is maintained at a temperature of between 100° C. and 230° C., accompanied by stirring and the reaction mixture containing the acidic adjuvant is maintained at a temperature of between 100° C. and 230° C., with stirring, for a period of time of at least 10 minutes, and wherein, in the said process, the acidic adjuvant is selected from the group consisting of polyphosphoric acids, acids of the formula $R-(COO)_t-SO_3H$, where t is 0 or 1 and R is a monovalent $C_1$ to $C_{12}$ hydrocarbyl radical, mixtures of at least one polyphosphoric acid and sulphuric acid, mixtures of at least one polyphosphoric acid and of at least one of the said acids $R-(COO)_t-SO_3H$, mixtures of sulphuric acid and of at least one of the acids $R-(COO)_t-SO_3H$, and mixtures of sulphuric acid with at least one polyphosphoric acid and at least one of the acids $R-(COO)_t-SO_3H$.

2. A process according to claim 1 wherein the acidic adjuvant is composed of a combination by weight, of 5% to 100% of at least one polyphosphoric acid and of 95% to 0% of at least one compound selected from the group consisting of sulphuric acid and the said acids $R-(COO)_t-SO_3H$.

3. A process according to claim 1, wherein the acidic adjuvant is composed of a combination, by weight, of 20% to 95% of at least one polyphosphoric acid and 80% to 5% of at least one member selected from the group consisting of sulphuric acid and methanesulphonic acid.

4. A process according to claim 1, wherein the polyphosphoric acids are compounds of the formula $P_qH_rO_s$, in which q, r and s are positive numbers wherein $q \geq 2$ and $5q+r-2s=0$.

5. A process according to claim 1, wherein the acids $R-(COO)_t-SO_3H$ are such that R is selected from the group consisting of linear $C_1$ to $C_{12}$ alkyl radicals, branched $C_1$ to $C_{12}$ alkyl radicals, $C_4$ to $C_{12}$ cycloalkyl radicals and monovalent $C_6$ to $C_{12}$ aromatic radicals.

6. A process according to claim 1, wherein the total amount of acidic adjuvant incorporated in the reaction mixture resulting from the crosslinking with sulphur represents 0.01% to 2.5% by weight of the bitumen or mixture of bitumens.

7. A process according to claim 1, wherein the bitumen or mixture of bitumens has a kinematic viscosity at 100° C. of between $0.5 \times 10^{-4} m^2/s$ and $3 \times 10^{-2} m^2/s$.

8. A process according to claim 1, wherein the bitumen or mixture of bitumens has a penetrability defined according to NF Standard T 66 004, of between 5 and 800.

9. A process according to claim 1, wherein the sulphur-crosslinkable elastomer is chosen from random or block copolymers of styrene and of a conjugated diene.

10. A process according to claim 9, wherein the copolymer of styrene and of conjugated diene contains, by weight, 5 to 50% of styrene.

11. A process according to claim 9, wherein the weight-average molecular weight of the copolymer of styrene and of conjugated diene is between 10,000 and 600,000 daltons.

12. A process according to claim 1, wherein the amount of sulphur-crosslinkable elastomer is 0.7% to 15% of the weight of the bitumen or mixture of bitumens.

13. A process according to claim 1, wherein the amount of sulphur-donor coupling agent is chosen to provide an amount of free sulphur representing 0.5% to 10% of the weight of the sulphur-crosslinkable elastomer.

14. A process according to claim 1, wherein the sulphur-donor coupling agent is selected from the group consisting of elemental sulphur, hydrocarbyl polysulphides, sulphur-donor vulcanization accelerators, mixtures of such products and mixtures of at least one of this product with at least one vulcanization accelerator which is not a sulphur-donor.

15. A process according to claim 1 which comprises:

contacting the sulphur-crosslinkable elastomer with the bitumen or mixture of bitumens, the operation being carried out at temperatures of between 100° C. to 230° C. and with stirring, for a sufficient period of time, of the order of a few tens of minutes to 8 hours, to form a homogeneous mixture, then incorporating the sulphur-donor coupling agent into the said mixture and maintaining the whole mixture with stirring at temperatures of between 100° C. and 130° C. and identical or not to the temperatures for mixing the elastomer with the bitumen or mixture of bitumens, for a period of time of at least 10 minutes to 5 hours, in order to form a reaction product constituting a crosslinked bitumen/polymer composition, and finally incorporating the desired amount of acidic adjuvant in the said reaction product, maintained at a temperature of between 100° C. and 230° C., with stirring, and maintaining the reaction mixture containing the acidic adjuvant at a temperature of between 100° C. to 230° C., with stirring, for a period of time ranging from 10 minutes to 5 hours, in order to form the bitumen/polymer composition with an expanded plasticity range.

16. A process according to claim 1, wherein the reaction mixture formed from the bitumen or mixture of bitumens, from the sulphur-crosslinkable elastomer and from the sulphur-donor coupling agent, resulting in the crosslinked bitumen/polymer composition which is then subjected to the action of the acidic adjuvant, has added to it, at any time in its constitution, 1% to 40%, by weight of the bitumen or mixture of bitumens, of a fluxing agent.

17. A process according to claim 16, wherein the fluxing agent is composed of a hydrocarbon oil which has an atmospheric pressure distillation range, determined according to ASTM Standard D 86-67, of between 100° C. and 600° C.

18. A process according to claim 17, wherein said hydrocarbon oil is selected from the group consisting of petroleum cuts of aromatic nature, petroleum cuts of an naphthenoaromatic nature, petroleum cuts of a naphthenoparaffinic nature, petroleum cuts of a paraffinic nature, coat oils and oils of plant origin.

19. A process according to claim 17, wherein the sulphur-crosslinkable elastomer and the coupling agent are incorporated into the bitumen in the form of a mother solution of these products in the hydrocarbon oil.

20. A process according to claim 19, wherein the mother solution is prepared by bringing into contact the ingredients of which it is composed, with stirring, at temperatures of between 10° C. and 170° C.

21. A process according to claim 19, wherein the mother solution contains, with respect to the weight of the hydrocarbon oil, 5% to 40% of a sulphur-crosslinkable elastomer and 0.02% to 15% of a sulphur-donor coupling agent.

22. A process according to claim 19, wherein from 80% to 95% by weight of the bitumen or mixture of bitumens is brought into contact, between 100° C. and 230° C. and with stirring, with 20% to 5% by weight of the mother solution, the latter containing, by weight of the hydrocarbon oil acting as a solvent, 10% to 35% of a sulphur-crosslinkable elastomer and 0.1% to 5% of a coupling agent, and then the mixture thus obtained is maintained with stirring between 100° C. and 230° C. for a period of time of at least 10 minutes in order to form the crosslinked bitumen/polymer composition which is subsequently subjected to the action of the acidic adjuvant.

23. A process for the production of bitumen/polymer binders, which comprises diluting the compositions of claim 1 with a bitumen or mixture of bitumens, which bitumen/polymer binders then can be employed, directly or after conversion into aqueous emulsion, in the production of coatings, in the production of bituminous mixes which are put in place with heating or cold, or in the production of watertight facings.

24. A process according to claim 1, wherein the acidic adjuvant is composed of a combination, by weight, of 20% to 100% of at least one polyphosphoric acid and of 80% to 0% of at least one compound selected from the group consisting of sulphuric acid and the said acids R—(COO)$_t$—SO$_3$H.

25. A process according to claim 1, wherein the acidic adjuvant is composed of a combination, by weight, of 40% to 90% of at least one polyphosphoric acid and of 60% to 10% of at least one member selected from the group consisting of sulphuric acid and methanesulphonic acid.

26. A process according to claim 4, wherein, in the formula, q ranges from 3 to 20.

27. A process according to claim 4, wherein said polyphosphoric acids are of the formula:

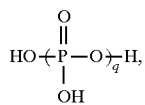

28. A process according to claim 27, wherein, in the formula, q ranges from 3 to 20.

29. A process according to claim 1, wherein the acids R—(COO)$_t$—SO$_3$H are such that R is selected from the group consisting of linear $C_1$ to $C_8$ alkyl radicals, $C_6$ to $C_8$ cycloalkyl radicals and monovalent $C_6$ to $C_8$ aromatic radicals.

30. A process according to claim 7, wherein the bitumen or mixture of bitumens has a kinematic viscosity at 100° C. of between $1\times10^{-4}$ m$^2$/s and $2\times10^{-2}$ m$^2$/s.

31. A process according to claim 8 wherein the penetrability is between 10 and 400.

32. A process according to claim 9, wherein the conjugated diene is selected from the group consisting of butadiene, isoprene, chloroprene, carboxylated butadiene and carboxylated isoprene.

33. A process according to claim 11, wherein the weight-average molecular weight is between 30,000 and 400,000 daltons.

34. A process according to claim 16, wherein the amount of fluxing agent represents 2% to 30% by weight of the bitumen or mixture of bitumens.

35. A process according to claim 17, wherein said distillation range is between 150° C. and 400° C.

36. A process according to claim 20, wherein the mother solution is prepared at temperatures of between 40° C. and 120° C.

37. A process according to claim 19, wherein the mother solution contains, with respect to the weight of the hydrocarbon oil, 10% to 35% of sulphur-crosslinkable elastomer and 0.1% to 5% of a sulphur-donor coupling agent.

38. A process according to claim 23, wherein the coatings are road surfacings.

* * * * *

UNITED STATES PATENT AND TRADEMARK OFFICE
CERTIFICATE OF CORRECTION

PATENT NO. : 5,880,185
DATED : March 9, 1999
INVENTOR(S) : Jean-Pacal PLANCHE and Patrick TURELLO It is certified that error appears in the above-indentified patent and that said Letters Patent is hereby corrected as shown below:

In item [73], "La Defense" should read --Courbevoie--

Abstract: Line 7; "232°C" should read --230°C--

Column 3, line 22; "$S_3$" should read --$SO_3$--

Column 4, Line 56; should include the following before Line 57: --in which $R_1$ and $R_2$ each--

Column 5, Line 45; should include the following before Line 46: --in which the symbols $R_4$, which--

Column 8, Line 13; "nonlenzenesulphonic" should read --nonylbenzenesulphonic--

Column 10, Line 42; "theological" should read --rheological--

Column 12, Line 4; "$H_2S_{so4}$" should read --$H_2SO_4$--

Column 12, in the table, example 4; under first column headed "σ(b)" "1.6" should read --1.8--

UNITED STATES PATENT AND TRADEMARK OFFICE
CERTIFICATE OF CORRECTION

PATENT NO. : 5,880,185
DATED : March 9, 1999
INVENTOR(S) : Jean-Pacal PLANCHE and Patrick TURELLO It is certified that error appears in the above-identified patent and that said Letters Patent is hereby corrected as shown below:

Column 14, Line 48; "130°C." should read --230°C.--

Column 15, Line 13; "coat oils" should read --coal oils--

Signed and Sealed this

Fourteenth Day of December, 1999

Attest:

Q. TODD DICKINSON

*Attesting Officer*  *Acting Commissioner of Patents and Trademarks*